(12) United States Patent
Hacohen

(10) Patent No.: US 10,392,240 B1
(45) Date of Patent: Aug. 27, 2019

(54) METHOD AND APPARATUS FOR MOBILE FUELING

(71) Applicant: SIMPLE REFUELING LTD, Tlalim (IL)

(72) Inventor: Yuval Hai Hacohen, Herzeliya (IL)

(73) Assignee: SIMPLE REFUELING LTD., Tlalim (IL)

( * ) Notice: Subject to any disclaimer, the term of this patent is extended or adjusted under 35 U.S.C. 154(b) by 0 days.

(21) Appl. No.: 16/165,270

(22) Filed: Oct. 19, 2018

(51) Int. Cl.
*B67D 7/04* (2010.01)
*G06Q 50/06* (2012.01)
*G06Q 20/40* (2012.01)

(52) U.S. Cl.
CPC ............... *B67D 7/04* (2013.01); *G06Q 20/40* (2013.01); *G06Q 50/06* (2013.01)

(58) Field of Classification Search
CPC .............. B67D 7/04; B67D 2007/0457; B67D 2007/0459; B67D 2007/0465
USPC .......................................................... 141/94
See application file for complete search history.

(56) References Cited

U.S. PATENT DOCUMENTS

| 5,072,380 | A | * | 12/1991 | Randelman | B67D 7/145 |
| | | | | | 235/383 |
| 5,596,501 | A | * | 1/1997 | Comer | B67D 7/228 |
| | | | | | 705/413 |
| 6,024,142 | A | * | 2/2000 | Bates | B67D 7/145 |
| | | | | | 141/351 |
| 6,070,156 | A | * | 5/2000 | Hartsell, Jr. | B67D 7/067 |
| | | | | | 705/413 |
| 7,640,185 | B1 | * | 12/2009 | Giordano | G06Q 20/208 |
| | | | | | 705/1.1 |
| 8,360,117 | B2 | * | 1/2013 | Hajiaghajani | B67D 7/3236 |
| | | | | | 141/1 |
| 8,381,779 | B1 | * | 2/2013 | Wyler | B64F 1/28 |
| | | | | | 141/192 |
| 2001/0034565 | A1 | * | 10/2001 | Leatherman | B67D 7/348 |
| | | | | | 700/232 |
| 2010/0088127 | A1 | * | 4/2010 | Betancourt | G06Q 10/02 |
| | | | | | 705/5 |
| 2011/0035049 | A1 | * | 2/2011 | Barrett | B67D 7/346 |
| | | | | | 700/232 |
| 2012/0095920 | A1 | * | 4/2012 | McQuade | H04L 9/3215 |
| | | | | | 705/50 |
| 2014/0195047 | A1 | * | 7/2014 | King | H04L 9/3215 |
| | | | | | 700/237 |
| 2014/0263629 | A1 | * | 9/2014 | McQuade | G07F 7/12 |
| | | | | | 235/381 |
| 2015/0106196 | A1 | * | 4/2015 | Williams | G06Q 20/227 |
| | | | | | 705/14.51 |

* cited by examiner

Primary Examiner — Timothy L Maust

(57) ABSTRACT

There is provided, in accordance with an embodiment of the present invention, a system and method are provided to enable mobile fuel management, the system including a mobile communications device, with an integrated Bluetooth capability, the device running an application that includes a file with instructions to execute commands to enable mobile fuel management; a fuel dispenser, with an integrated BLAP device; and a fuel station computer system, communicatively connected to a computing cloud, and associated with a dispenser database, the computer system running code to execute commands to enable mobile fuel management; wherein the fuel dispenser executes fuel dispensing only after a matching between the mobile communications device and the fuel dispenser.

18 Claims, 4 Drawing Sheets

METHOD AND APPARATUS FOR MOBILE FUELING

CROSS REFERENCE TO RELATED APPLICATIONS

This application is a continuation of U.S. application Ser. No. 15/779,081 filed May 24, 2018, which is a national stage entry of PCT/US17/42326 filed Jul. 17, 2017, which claims priority to U.S. Provisional Patent Application No. 62/363,283, filed Jul. 17, 2016, all of which are incorporated by reference in their entirety.

FIELD OF THE INVENTION

The present invention relates to the field of fuel dispensing, and in particular, to a method and system for vehicle fueling using mobile devices.

BACKGROUND OF THE INVENTION

A modern fueling station controls fueling dispensers via a computer system enabling various payment methods known in the art that, upon authorization, enables a fueling dispensing. These payment methods include card-based readers (credit/debit cards, fueling cards and the like), fuel dispenser's nozzle readers and fueling tank identification devices and the like. These payment methods allow a client to fuel in self-service manner even in unattended fuel stations.

Some known fueling payment means use card-based payment (magnetic stripe or chip), Near Field Communications (NFS). Radio Frequency Identification (RFID) and the like for client and fuel-station devices to communicate between themselves to authorize and commence the fuel dispensing. This is inconvenient and costly since clients and fuel-stations devices are required to embed the technology (both hardware and software) through upgrading or replacing their devices.

Further, some known payment methods require the client to perform physical authorization actions either in the fueling-station's Point of Sale (POS) or with terminals and readers installed on or near the fuel dispenser, which is often inconvenient since it takes time and sometimes cannot be deployed in unattended fueling station or as self-service fueling.

It would be beneficial to have an improved method of fueling that provides a more convenient way to fulfill a fueling transaction to commence fuel dispensing.

SUMMARY OF THE INVENTION

There is provided, in accordance with an embodiment of the present invention, a system and method to enable mobile fuel management, the system including a mobile communications device, with an integrated Bluetooth capability, the device running an application that includes a file with instructions to execute commands to enable mobile fuel management; a fuel dispenser, with an integrated BLAP device; and a fuel station computer system, communicatively connected to a computing network, and associated with a dispenser database, the computer system running code to execute commands to enable mobile fuel management; wherein the fuel dispenser executes fuel dispensing only after a matching between the mobile communications device and the fuel dispenser.

In some embodiments, the system includes a plurality of fuel dispensers.

In some embodiments, each of the plurality of fuel dispensers includes a positioning element adapted to determine a proximity of each connected mobile communications device, to thereby determine a most proximal mobile device and to match with the most proximal fuel dispenser.

In some embodiments, the fuel dispenser executes a fueling operation only after a matching between the mobile communications device, the vehicle driver, and the fuel dispenser.

In some embodiments, the fuel dispenser executes a fueling operation only after a matching between the mobile communications device and the fuel dispenser, on condition that the user's payment means is approved or authorized.

In some embodiments, the fuel dispenser executes a fueling operation only after a multiple step matching is established between the mobile communications device and the fuel dispenser.

In some embodiments, the system includes a database, including a memory having stored thereon, to maintain fueling related records.

In some embodiments, the system includes a security component, including instructions to execute commands to enable verification of mobile communications devices prior to commencing a fueling operation.

In some embodiments, the system includes one or more communication beacons.

In some embodiments, the dispenser(s) include a dispensing nozzle identification element, to enable identification of a fuel type being requested by a user.

In some embodiments, the dispenser(s) may dispense fuel types selected from the group consisting of one or more gas, petrol, diesel, gasoline, oil and natural gases.

There is provided, in accordance with an embodiment of the present invention, a system and method are provided to enable mobile fuel management, the method including running one or more files with instructions to execute commands to enable dispensing of fuel to a vehicle, the instructions including calculating the proximity of a mobile communications device to a fuel dispenser according to preset values of radio signal level/strength range, and the fuel dispenser location, to identify a fuel dispenser being engaged by a user.

In some embodiments, the method includes verifying the identity of the mobile communications device prior to dispensing fuel to the vehicle.

In some embodiments, the method includes verifying the identity of the user of the mobile communications device prior to dispensing fuel to the vehicle.

In some embodiments, the method includes verifying the identity of the vehicle owner prior to dispensing fuel to the vehicle.

In some embodiments, the method includes identifying the preferred fuel type of the vehicle, prior to dispensing fuel to the vehicle.

In some embodiments, the method includes demanding a secondary security verification prior to dispensing fuel to the vehicle.

BRIEF DESCRIPTION OF THE DRAWINGS

The invention, both as to organization and method of operation, together with objects, features, and advantages thereof, may best be understood by reference to the following detailed description when read with the accompanying drawings in which.

Figure 1:
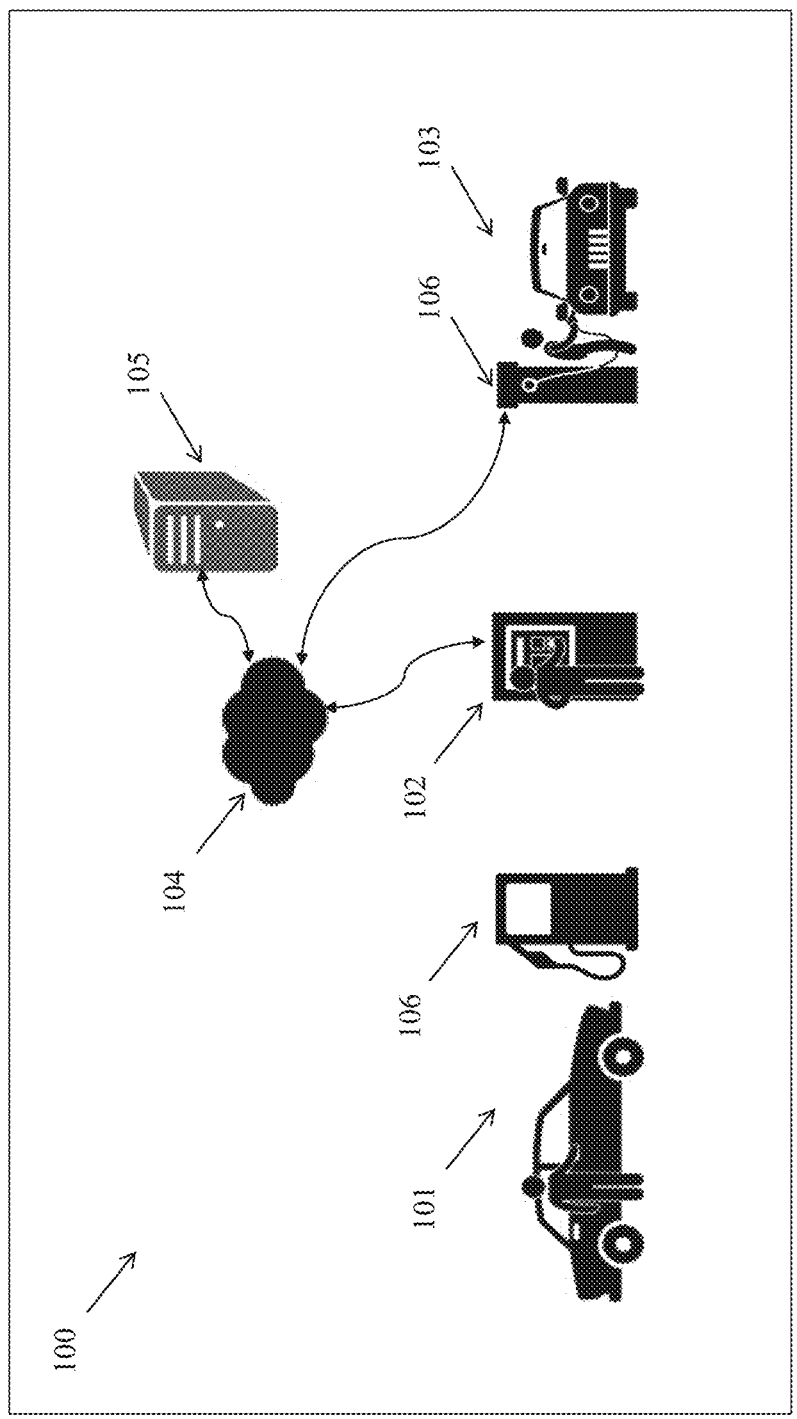
FIG. 1 is a schematic illustration of a prior art fueling process, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "dispenser" as used herein refers to a gas or fuel pump in a service station that draws gasoline or other fuels from underground storage tanks. The term "gas" refers to one or more types or variations of petrol, diesel, gasoline, oil, natural gas or other fuels. The term "mobile device" as used herein refers to computing or communications device, such as a smart phone. PDA, wearable computer, vehicle computer, tablet, mobile computer or other smart device.

Bluetooth® technology known in the art enables a Bluetooth® enabled mobile device to identify other Bluetooth® devices in their proximity and to measure the received radio signal level/strength. The received radio signal level/strength is influenced by the physical distance between two devices. Every single Bluetooth® device in the world has a unique (e.g., 48-bit) identification address (e.g., BD_ADDR). This address is being transmitted periodically to enable other Bluetooth® enabled devices to discover, identify and communicate over a communications medium.

In some embodiments, smartphone or other computing devices may utilize wireless capabilities such as Wi-Fi and NFC (Near Field Communications), or other wireless suitable protocols. Using Wi-Fi may be used, for example, to provide increased, and may typically provide non-unique identification since its identification mechanism may uses configurable, non-unique SSID (Service Set Identifier) that is sent over the air to enable Wi-Fi enabled devices to connect to it. Using NFC may provide unique identification, typically over a short range (up to several centimeters).

As is well known in the art, cell-phones devices are capable of communicating over data networks (e.g. 3G. Wi-Fi, Bluetooth®) and execute applications which are computer programs that can be downloaded from a portal (e.g. App-Store, Google Play). As mobile devices, such as PDAs, mobile phones, smart phones, and wearable computers, have become widely used, and are commonly equipped with Bluetooth® technology (a low-power wireless technology for exchanging data over short distance).

As is also known in the art, modern fueling stations use computer systems and processes to control, secure and execute payment for fueling dispensing. These computer systems can receive computerized commands through communication network to commence fueling once authorization is achieved. Such authorizations are generally achieved by using identification devices (e.g. fueling cards) or payment means (e.g. credit card).

Non-limiting embodiments of the present invention include a system, method and/or means using Bluetooth® enabled client mobile devices and a Bluetooth® apparatus installed on or near a fuel dispenser, to facilitate mobile device fueling management.

In some embodiments of the present invention, the mobile fueling system includes: one or more mobile devices; one or more applications for mobile devices, one or more Bluetooth® Apparatus (BLAP) and one or more computer systems controlling one or more fuel dispensers.

A Bluetooth® Apparatus (BLAP) contains a Bluetooth® radio transmitter circuitry, a power source and an antenna known in the art that emits a Bluetooth® radio signal. In one preferred embodiment, a client or end user uses an application for a mobile device to discover BLAP devices in its proximity. A discovery process provides a list of Bluetooth® devices in the proximity, each identified by its unique address (e.g., BD_ADDR). An application for mobile device sends this data over a communication network (e.g. cellular data, Wi-Fi) to, in the current case, a fuel station's computer system. The fuel station's computer system uses preset values (e.g. database table) to identify a fuel dispenser that is linked to a BLAP address. Once identified, a fueling dispenser can commence fueling.

In another embodiment, an application for mobile device measures BLAP radio signal level/strength and sends it over the communication network to a fuel station's computer system. A fuel station's computerized system calculates the proximity of a mobile device to a fuel dispenser according to preset values (e.g. database table) of radio signal level/strength range, and the fuel dispenser locations, to better identify a fuel dispenser being engaged by a user.

In another embodiment, a client uses an application for mobile device for client identification, using one or more mobile device hardware identifiers. Hardware identifiers such as Android ID, Universal Device ID (UDID). Android Advertising ID, Windows Advertising ID, Apple's Identifier For Advertisers (IFA or IDFA) and the like are world-wide unique identifiers built into mobile devices. Hardware identifiers can be accessed via an application for a mobile device. A fuel station computer system may use preset values (e.g. database table) to identify a client account that is linked to a hardware identifier. Once there is match established between the fuel station computer system and the vehicle owner device (referred to hereinafter as 'matching'), a fueling transaction can be associated with a client account, and a fueling dispenser can commence fueling.

In a further embodiment, a client uses an application for mobile device for client identification using software identifiers. Software identifiers are unique identifiers (unique in a computerized system) such as user name, password, pin code, e-mail address, social security number and the like. A fuel station computer system may use preset values (e.g. database table) to identify a client account that is linked to one or more software identifiers. Once identified, a fueling transaction can be associated with a client account, and a fueling dispenser can commence fueling. In a further embodiment, a client uses an application for mobile device for client identification using hardware and software identifiers. Once identified, a fueling transaction can be associated with a client account, and a fueling dispenser can commence fueling.

In a further embodiment, a client uses an application for mobile device to provide payment means information such as credit/debit card number, bank account number and the like. This information is sent by an application for a mobile device to a fuel station computer system, to charge the amount of the fueling transaction once the fuel dispensing finishes.

In a further embodiment, an application for a mobile device provides a fuel station computer system with mobile device location information (e.g. GPS—Global Positioning System). This location information may be used to provide better security and proof of fueling in case of fraud or dispute.

In a further embodiment, a client uses an application for a mobile device to provide a fuel volume limit or fuel transaction amount limit used by a fuel station computer system, to stop fuel dispensing once such a limit is reached.

Reference is now made to FIG. 1, which is a schematic illustration of a prior art fueling process 100. Upon arrival to a fuel station (101) a client uses payment means with a payment kiosk (102). As an example, payment mean can be a credit card and a payment kiosk may contain a card reader. A payment kiosk (102) communicates over a computer network (104) with a fuel station computer system (105). Once authorized and identified, or paired or matched, a fuel station computer system (105) communicates with a fuel dispenser (106) and fueling can commence (103). Some prior art systems use additional hardware and software such as identification device installed in a car fuel tank top that can be read by the fuel dispenser (106) hose.

Figure 2:
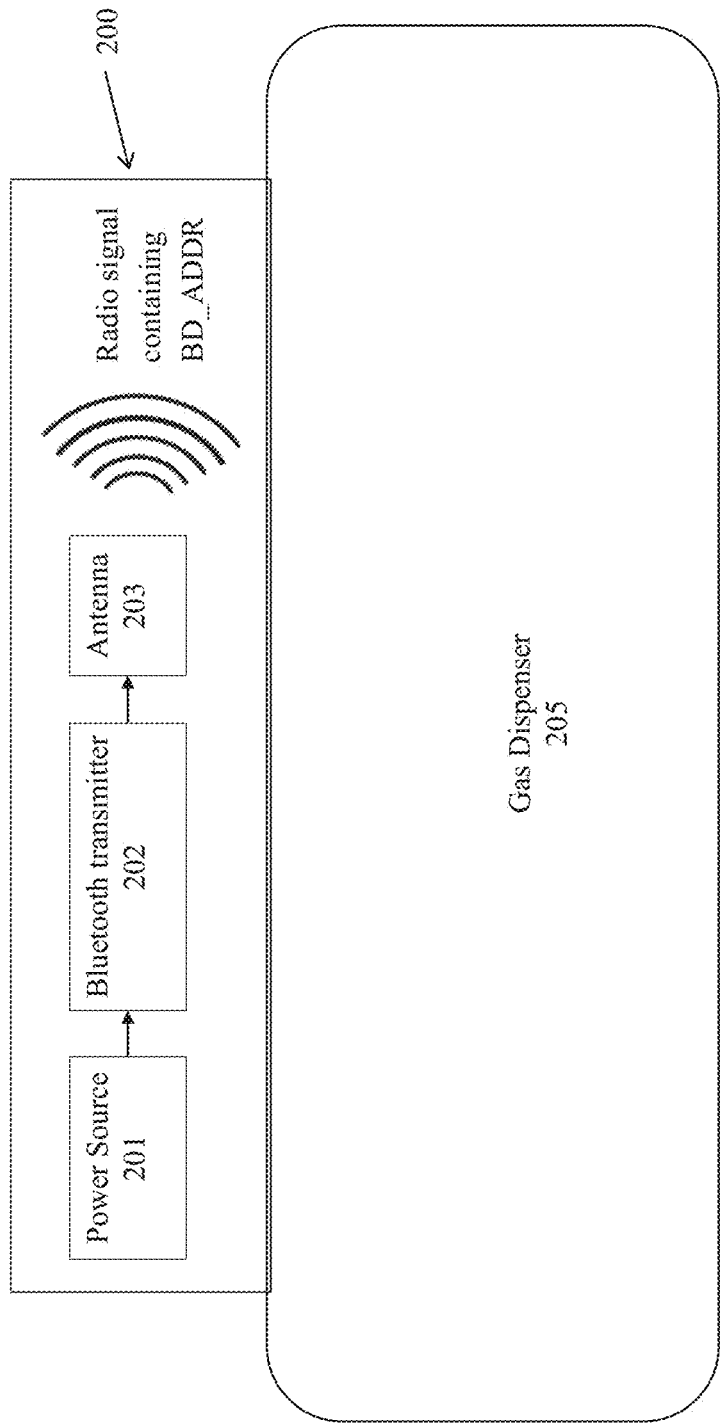
FIG. 2 is a schematic illustration of a prior art Bluetooth® transmitter, according to some embodiments.

Reference is now made to FIG. 2 which is a schematic illustration of Bluetooth® transmitter device (BLAP) 200, generally integrated into a fuel dispenser 205 or service station dispenser system. Once powered by power source (201), the BLAP transmitter (202) transmits a radio signal through the antenna (203) to the air. A Bluetooth® radio signal known in the art contains a unique address (e.g., BD_ADDR) transmitted periodically to enable other Bluetooth® enabled devices to discover the Bluetooth® radio signal, measure Bluetooth® radio signal level/strength, and receive a BD_ADDR.

Figure 3:
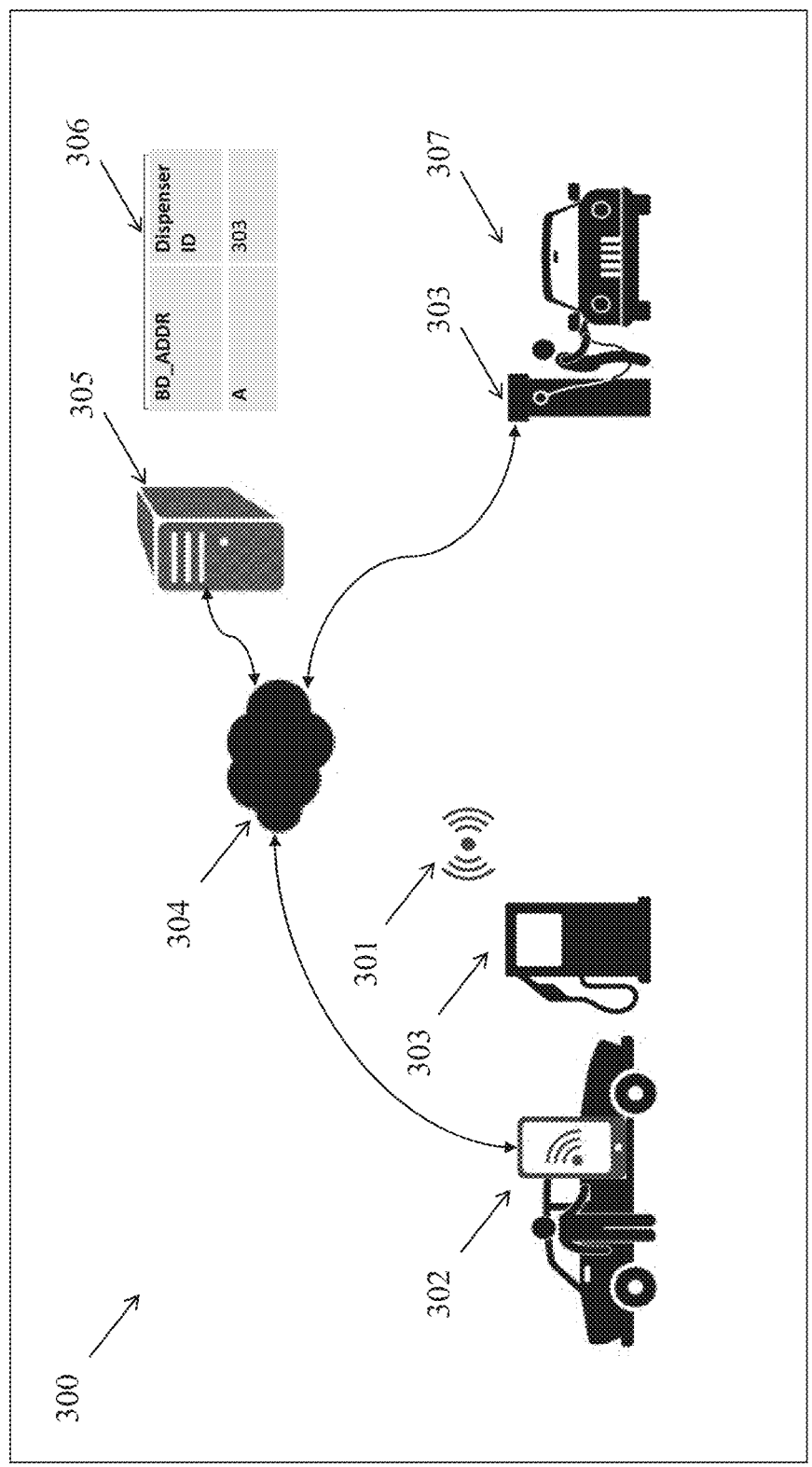
FIG. 3 is a schematic illustration of mobile device and application with BLAP device for fueling process according to one embodiment of the present invention.

Reference is now made to FIG. 3 which is a schematic illustration of a system 300 and method for managing mobile fueling, according to some embodiments. System 300 includes a mobile device and application with a BLAP device (302), according to some embodiments of the present invention. Upon arrival to a fuel station a client uses mobile device application (302) to discover a BLAP device (301) unique address (BD_ADDR), associate with one or more fuel dispensers 303. An identified BD_ADDR is sent by the mobile device application (302) over a computer network (304) to a fuel station computer system (305). The fuel station computer system (305) identifies the fuel dispenser 303 using a connected database, such as a preset table (306). Once there is match established between the fuel station computer system, the fuel dispenser, and the vehicle owner device, the fuel station computer system (305) communicates with the fuel dispenser (303) and fueling can commence (307).

Figure 4:
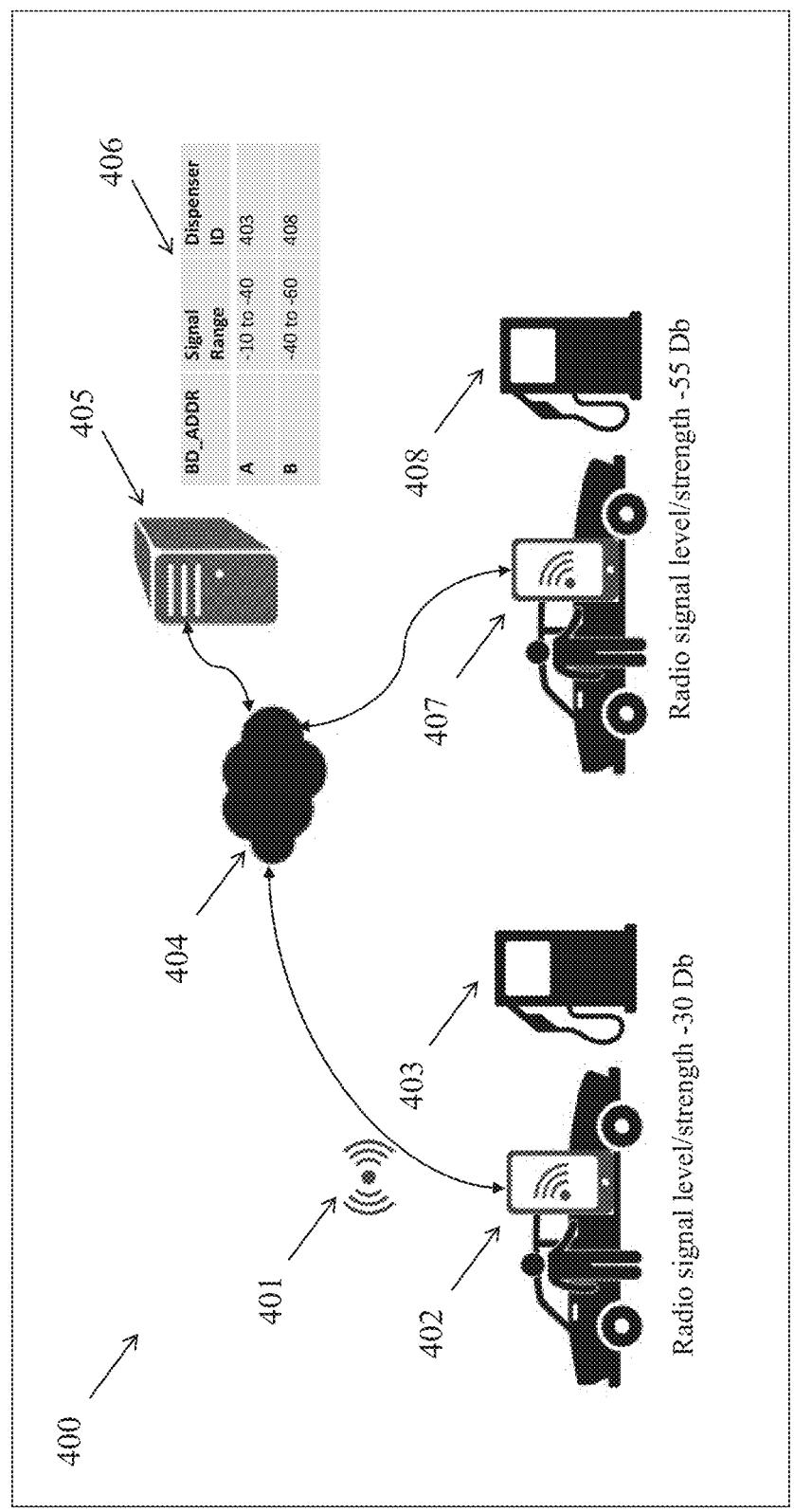
FIG. 4 is a schematic illustration of mobile device and application with BLAP device for fueling process in a fuel station with plurality of fuel dispensers according to one embodiment of the present invention.

Reference is now made to FIG. 4 which is a schematic illustration of a system 400 and method for managing mobile fueling, according to some embodiments. System 400 includes a BLAP device (401) associated with a plurality of fuel dispensers, and a mobile device and application with a BLAP device (402, 407 etc.) for fueling process management in a fuel station with a plurality of fuel dispensers (403, 408 etc.). Upon arrival to a fuel station, a plurality of mobile device users or clients use a plurality of mobile device applications to discover a BLAP device (401) unique address (BD_ADDR) and the Bluetooth® received radio signal level/strength. An identified BD_ADDR and received radio signal level/strength are sent by the mobile device applications (402, 407) over a computer network (404) to a fuel station computer system (405). The fuel station computer system (405) identifies one or more fuel dispensers, for example using a close-range wireless signal, using a connected database, such as a preset table (406) containing both BD_ADDR and signal range. Once both elements are paired, connected or matched, a fuel station computer system (405) communicates with an identified fuel dispenser (403 or 408) and fueling can commence.

According to certain embodiments, usage of Bluetooth provides means for identification using a unique number, for example, 48 bits address (BD_ADDR) and a beacon that enables other devices to sense other Bluetooth devices in its range. Moreover, it provides the ability to measure the beacon level of reception (measured in dbm). One known usage of Bluetooth beacon is Apple's iBeacon which is a protocol that enables smartphones, tablets and other Apple supported devices to perform actions when in close proximity to an iBeacon. iBeacon differs from some other location-based technologies as the broadcasting device (beacon) is only a 1-way transmitter to the receiving smartphone or receiving device, and necessitates a specific application installed on the device, optionally embedded in the device operating system, to interact with the beacons. This ensures that only the installed app (not the iBeacon transmitter) can track users, potentially against their will, as they passively move around the transmitters. In some embodiments, a beacon may be configured for a gas station, to help identify when a registered user is physically proximate to the station, to enable automated fueling to the user account/vehicle/credit card. In some embodiments, a beacon may be configured on a dispenser, or for several dispensers in a gas station, to help identify when a registered user is physically proximate to a specific dispenser, to enable automated fueling to the user account/vehicle/credit card.

In some embodiments, the system may support usage of multiple fuel types, thereby to help identify the exact nozzle in a multi-nozzle dispenser being used. Many dispensers (fuel pumps) provide multiple nozzles and it is important to open only the one that fits the vehicle's fuel-type. In some embodiments, the fuel-type information is provided by the customer in the smartphone application during the registration process. Whether using a Bluetooth address and signal level or other means to provide a unique identification of a nozzle, dispenser and/or station, this information may provide to the fuel company's system the precise information needed to commence the fueling process, and avoid mismatches, like providing the wrong fuel type to a vehicle.

Fleet management is a substantial challenge, to try avoid fueling fraud and other fuel related abuses. There are available devices that connect to the vehicle (typically to the CANBUS or OBD2 interfaces) to uniquely identify the vehicle and provide additional information such as speedometer reading. This technology typically requires adding a device connected to the vehicle's system (e.g., OBD2/CANBUS) with a type of antenna in the vehicle's fueling tank opening, and an additional device and antenna in the nozzle head. Further, this wireless communication technology (e.g., communicating between the vehicle's device antenna and the nozzle's device antenna) can be used with gasoline and diesel, but does not operate with Gas fueled vehicles due to the highly flammable environment in the fueling nozzle/tank.

According to certain embodiments, vehicle identification mechanisms, based on mobile communication device matching, may be used when using natural gas fuel or other fuel types. In such cases the vehicle may benefit from double verification of driver and vehicle, without having potentially hazardous communications components in the gas tanks.

In some embodiments, a vehicle fleet support mechanism and process may be provided, by using different registration and/or payment information relating to a fleet or fleet owner (e.g., not a personal credit card). Typically, fleets of vehicles may have agreements with the fueling company and the fueling company provides identification information, such as fleet number, list of vehicles, pin code etc. In some examples, fleet related information may be connected to the smartphone application, such that fleet drivers fueling activities and/or payments may be charged through the fleet's account.

In some embodiments, a vehicle fleet support mechanism and process may be used to provide fleet owners another level of security to reduce the incidence of fueling fraud, by requiring actual smart phone proximity to the dispenser, thereby connecting the fueling device to the vehicle.

In still further embodiments, a commercially available vehicle identification device (such as wifi iCar2 elm327 adapter) that connects to the OBD 2 (diagnostics port) and enables reading the globally-unique vehicle identification number (VIN), the speedometer and the like may be used, in addition to the smartphone application. In this way, the smartphone can communicate with the adapter device, read the information provided, and convey it together with the nozzle/dispenser/station data as part of the invention fueling process.

In further embodiments, enhanced credit card payment security mechanisms may be enabled, since the card information no longer needs to be sent from the smartphone to the fueling company's computer to execute the payment. This type of payment may be referred to as "Card Not Present" and requires an additional security code known in the art (e.g. Card Verification Value/Data/Code) to reduce the incidence of credit card fraud.

Further, fuel payment mechanisms that enable fueling applications for smartphones may facilitate a type of fraud used by fueling company employees. For example, some fueling services using credit cards require the employee to copy, picture or scan their credit card and use it to register the application. Thereafter, the user may use the application to purchase small amounts of fuel which most people do not identify. This kind of fraud is not restricted for fueling, it is a risk in any wallet-based application. In some embodiments, once the credit card information is entered during the registration, the card information is sent to a credit card company. The credit card company retrieves the card holder information, and may also retrieves the phone number within its records, and thereafter send an SMS with a security code, which the user needs to enter to complete the registration.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A system for fueling management, comprising:
   a BLAP device associated with at least one of a plurality of fuel dispensers; said BLAP device adapted for transmitting a BLAP ID;
   a data base associating a location to a most proximal dispenser of said plurality of fuel dispensers based on said BLAP ID of a received signal from said BLAP device associated with said at least one fuel dispenser and a signal strength of said received signal at said location;
   a computing device in communication with said plurality of fuel dispensers, said computing device configured for:
      communicating over a data network with a mobile communication device adapted for receiving said BLAP ID and measuring said signal strength,
      selecting said most proximal dispenser to said mobile communication device based on said BLAP ID and received signal strength measured by said mobile communication device, and
      instructing said most proximal dispenser to dispense fuel to a vehicle associated with said mobile communication device.

2. The system of claim 1, further including a positioning element in communication with said computing device and adapted to determine location of said mobile communication device.

3. The system of claim 1, wherein the computing device is configured for said instructing said most proximal dispenser to dispense said fuel only after a matching between said mobile communication device, a driver of said vehicle, and said most proximal dispenser.

4. The system of claim 1, wherein the computing device is configured for authorizing a user's payment information and wherein said instructing said most proximal dispenser to dispense said fuel is only after said authorizing.

5. The system of claim 1, wherein said computing device is further configured for verifying of said mobile communication device prior to commencing a fueling operation.

6. The system of claim 1, said most proximal dispenser includes a plurality of fuel types, and wherein said computing device is further configured for said instructing to include fueling said vehicle with a fuel type being requested by said mobile device.

7. The system of claim 1, wherein said most proximal dispenser is configured for dispensing fuel types selected from the group consisting of one or more of gas, petrol, diesel, gasoline, oil and natural gases.

8. The system of claim 1, wherein said BLAP device associated with said at least one fuel dispenser is installed on or near the at least one fuel dispenser.

9. The system of claim 1, wherein said BLAP device associated with said at least one fuel dispenser is installed within range to said at least one fuel dispenser for said BLAP ID transmitted by said BLAP device associated with said at least one dispenser to received by said mobile communication device located at said at least one fuel dispenser.

10. The system of claim 9, wherein the most proximal dispenser is configured to execute a fueling operation in accordance with said instructing only after a matching is established between said vehicle and said mobile communication device.

11. A method for facilitating fueling management, comprising:
- transmitting a BLAP ID by a BLAP device, said BLAP device being associated with at least one fuel dispenser of a plurality of fuel dispensers;
- providing a data base associating a location to a most proximal dispenser of said plurality of fuel dispensers based on said BLAP ID of a received signal from said BLAP device associated with said at least one fuel dispenser and a signal strength of said received signal at said location;
- selecting according to said data base said most proximal dispenser of said plurality of fuel dispensers, said most proximal dispenser proximal to a mobile communication device based on a signal strength of said BLAP ID received from said BLAP device, by the mobile communication device;
- instructing said most proximal dispenser to fuel a vehicle associated with said mobile communication device.

12. The method of claim 11, wherein said instructing includes
- receiving said BLAP ID by a computing device associated with said plurality of fuel dispensers from said mobile communication device over a network and wherein said instructing is performed by said computing device.

13. The method of claim 12, further comprising verifying an identity of a user of said mobile communication device prior to dispensing fuel to the vehicle.

14. The method of claim 11, further comprising verifying an identity of the vehicle associated with said mobile device prior to dispensing fuel to the vehicle.

15. The method of claim 11, further comprising identifying a preferred fuel type associated with said mobile communication device, prior to dispensing fuel to the vehicle and wherein said instructing is to fuel said vehicle with said preferred fuel type.

16. The method of claim 11, further comprising demanding a secondary security verification prior to dispensing fuel to the vehicle associated with said mobile communication device.

17. The method of claim 11, wherein said BLAP device associated with said at least one fuel dispenser is installed on or near the at least one fuel dispenser.

18. The method of claim 12, further comprising executing a payment for fueling said vehicle from an entity associated with said mobile communication device, said executing performed by the computing device.

* * * * *